United States Patent [19]
Matsumoto et al.

[11] Patent Number: 5,562,878
[45] Date of Patent: Oct. 8, 1996

[54] PROCESS FOR PRODUCING SKIN MATERIAL LAMINATED HOLLOW MOLDED ARTICLE USING FLUID EJECTION PIN

[75] Inventors: Masahito Matsumoto, Ibaraki; Takeo Kitayama, Takatsuki; Satoru Funakoshi, Moriguchi; Shigeyoshi Matubara, Osaka, all of Japan

[73] Assignee: Sumitomo Chemical Company, Limited, Osaka, Japan

[21] Appl. No.: 256,979
[22] PCT Filed: Dec. 7, 1993
[86] PCT No.: PCT/JP93/01773
    § 371 Date: Aug. 3, 1994
    § 102(e) Date: Aug. 3, 1994
[87] PCT Pub. No.: WO94/13456
    PCT Pub. Date: Jun. 23, 1994

[30] Foreign Application Priority Data

Dec. 7, 1992 [JP] Japan ................................. 4-326475
Feb. 15, 1993 [JP] Japan ................................. 5-025414

[51] Int. Cl.[6] .................................................. B29C 44/06
[52] U.S. Cl. ........................... 264/513; 264/572; 264/516
[58] Field of Search ................................... 264/511, 513, 264/516, 572, 512

[56] References Cited

U.S. PATENT DOCUMENTS 4,968,474  11/1990  Ito .
5,127,814   7/1992  Johnson et al. .
5,283,028   2/1994  Breezer et al. ........................... 264/511

FOREIGN PATENT DOCUMENTS 488121   3/1992  European Pat. Off. .
322285   6/1989  France .
320925   6/1989  Germany .
60-54836 3/1985  Japan .
60-54497 4/1985  Japan .
61-123514 6/1986 Japan .
4-259530  9/1992  Japan ................................. 264/513

OTHER PUBLICATIONS

Patent Abstract of Japan, vol. 15 No. 260, Apr. 12, 1991.

Primary Examiner—Catherine Timm
Attorney, Agent, or Firm—Cushman Darby & Cushman, L.L.P.

[57] ABSTRACT

A process for producing a skin material-laminated hollow molded article of thermoplastic resin, using a mold having, in any one or both of its fixed and movable parts, at least one fluid-ejecting pin which can be slid in a clamping direction and which has a fluid-ejecting hole at its pointed end. The process consists of fixing two sheets of a skin material having a tensile modulus at ambient temperature of 50–1,000 kg/cm² and a tensile modulus at 80° C. of 5 to 100 kg/cm² on the parting surfaces of both the mold parts which are in the open state. A molten thermoplastic resin is fed between the skin materials in an amount of 5 to 50% by volume of the cavity volume. The fluid-ejecting pin is thrusted so that its pointed end penetrates one of the skin material sheets and comes between the skin material sheets. The mold parts are closed to wrap the molten thermoplastic resin in between the skin material sheets. A fluid is ejected from the fluid-ejecting hole to intimately contact the skin material sheets with the cavity surface of the mold while allowing the molten resin to form a hollow. The mold is cooled and the ejection of the fluid is stopped. The mold is then opened and the hollow molded article is removed.

8 Claims, 5 Drawing Sheets

PROCESS FOR PRODUCING SKIN MATERIAL LAMINATED HOLLOW MOLDED ARTICLE USING FLUID EJECTION PIN

TECHNICAL FIELD

This invention relates to a process for producing a skin material-laminated hollow molded article of thermoplastic resin.

BACKGROUND OF THE INVENTION

A blow molding method, a gas injection molding method and the like are well-known as a process for producing a hollow molded article using a thermoplastic resin.

However, in the skin material-lamination molding by a blow molding method, it is impossible to control the wall thickness of a skin material-laminated hollow molded article of thermoplastic resin, and hence, there is such a problem that it is difficult to obtain a molded article having a uniform and desired wall thickness. In addition, there are such many problems that the thermoplastic resins used are limited by their flow characteristics, viscosity and the like in the molten state and the shape of the molded article cannot respond to a shape having a high blow ratio.

On the other hand, a gas injection molding method is known as a process for molding a thermoplastic resin hollow molded article which is hardly affected by the flow characteristics, viscosity and the like of the molten thermoplastic resin, capable of controlling the wall thickness and can respond to a shape having a high blow ratio; however, according to said method, it was difficult to produce a skin material-laminated molded article in which the skin material is an exterior decorative surface though said method was applicable to a process for producing a molded article consisting of only a resin without using a skin material.

DISCLOSURE OF THE INVENTION

Under such circumstances, the present inventors have made extensive research on a process for producing a skin material-laminated hollow molded article of thermoplastic resin in which the wall thickness is uniform and can be easily controlled without being subject to restriction of resin to be used and which can respond to a shape having a high blow ratio, and have, as a result, reached this invention.

That is to say, this invention provides a process for producing a skin material-laminated hollow molded article of thermoplastic resin, using a mold having, in any one or both of its fixed and movable parts, one or two or more fluid-ejecting pins which can be slid in the clamping direction and have each a fluid-ejecting hole at its pointed end, which process consists of the following steps:

(1) a step of fixing two sheets of skin material having a tensile modulus at ordinary temperature of 50–1,000 kg/cm$^2$ and a tensile modulus at 80° C. of 5 to 100 kg/cm$^2$ on the parting surfaces of both the mold parts which are in the open state, (2) a step of feeding a molten thermoplastic resin between the skin materials in an amount of 5 to 50% by volume of the cavity volume, (3) a step of thrusting the fluid-ejecting pins so that the pointed ends of the pins penetrate one of the skin materials and come between the skin materials, (4) a step of closing both the mold parts to wrap the molten thermoplastic resin in between the skin materials, (5) a step of ejecting a fluid from the fluid-ejecting holes to intimately contact the skin material and the molten thermoplastic resin with the cavity surface of the mold while forming a hollow part by the ejecting pressure, (6) a step of cooling the mold while keeping this state and stopping the ejection of the fluid, and (7) a step of opening the mold and taking out a hollow molded article.

In the above process, the order of the step (2) and the step (3) may be such that either of them is prior to the other step. Moreover, after the step (2), the step (4) may be carried out prior to the step (3).

Furthermore, between the steps (6) and (7), a step of putting the fluid-ejecting pins back in the mold may be added.

Figure 1:
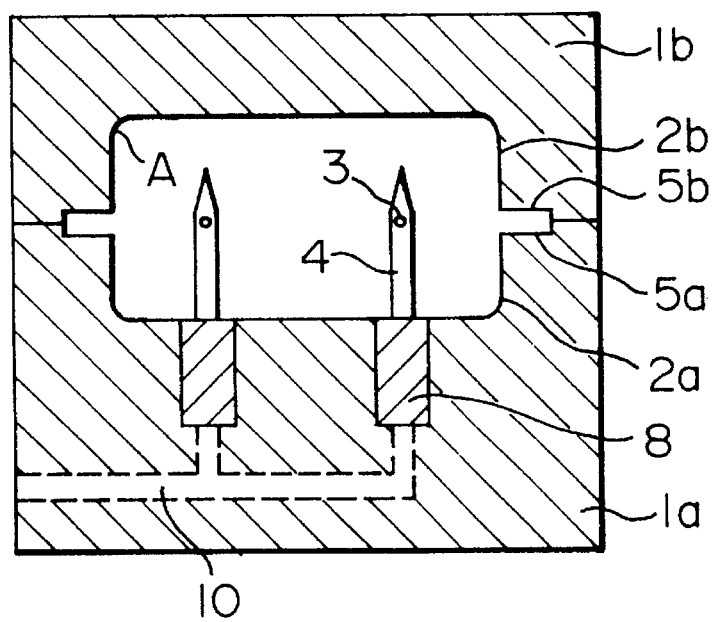
FIG. 1 is a sketch drawing of the process for producing a skin material-laminated hollow molded article of thermoplastic resin of this invention, and shows a mold before starting the production

Incidentally, the symbols used in each of the above figures have the following meanings:

1a: Fixed mold part, 1b: Movable mold part

2a: Cavity surface of the fixed mold part
2b: Cavity surface of the movable mold part
3: Fluid-ejecting hole, 4: Fluid-ejecting pin
5a: Parting surface of the fixed mold part
5b: Parting surface of the movable mold part
6a: Skin material, 6b: Skin material
7: Thermoplastic resin,
8: Fluid-ejecting pin-sliding means
9: Hollow part, 10: Fluid-feeding path
11: Pin trace, 12: Rib, 13: Rib hollow part
A: Dimension of mold cavity corner part
B: Dimension of hollow molded article corner part

BEST MODE FOR PRACTICING THE INVENTION

This invention provides a process for producing a skin material-laminated hollow molded article of thermoplastic resin, using a mold having, in at least one mold part selected from a fixed mold part and a movable mold part; one or two or more fluid-ejecting pins which can be slid in the direction in which the movable part moves; has a fluid-ejecting hole at its pointed end, which process consists of the following steps:
(1) a step of fixing two sheets of skin material having a tensile modulus at ordinary temperature of 50–1,000 kg/cm$^2$ and a tensile modulus at 80° C. of 5 to 100 kg/cm$^2$ on the parting surfaces of both the mold parts which are in the open state,
(2) a step of feeding a molten thermoplastic resin to between the skin materials in an amount of 5 to 50% by volume of the cavity volume,
(3) a step of thrusting the fluid-ejecting pins so that the pointed ends of the pins penetrate one of the skin materials and come to between the skin materials,
(4) a step of closing both the mold parts to wrap the molten thermoplastic resin in between the skin materials,
(5) a step of ejecting a fluid from the fluid-ejecting holes to intimately contact the skin material with the cavity surface of the mold while allowing the molten resin to form a hollow part,
(6) a step of cooling the mold while keeping this state and stopping the ejection of the fluid, and
(7) a step of opening the mold and taking out a hollow molded article.

In the above process, the order of the step (2) and the step (3) may be such that either of them is prior to the other, and after the step (2), the step (4) may be carried out prior to the step (3).

Moreover, between the step (6) and the step (7), a step of putting the fluid-ejecting pins back in the mold may be added.

The mold to be used in this invention is, as shown in FIG. 1, composed of the fixed mold part 1a and the movable mold part 1b which can move up and down, and each mold part is set in a press apparatus (not shown in the figure). These mold parts have cavity surfaces 2a and 2b corresponding to the shape of molded article and at least one of the mold parts can be slid in the clamping direction and is equipped with fluid-ejecting pins having a fluid-ejecting holes 3 at there pointed ends.

At least one fluid-ejecting pin is provided, and two or more fluid-ejecting pins may be provided. The number thereof may be selected freely depending upon the size of the objective hollow molded article and is not particularly limited.

These fluid-ejecting pins are laid in the mold part and slid in the mold part so as to project into the mold in the formation of the hollow molded article, and their rear ends are connected to the fluid-feeding tube 10.

The sliding means 8 for the fluid-ejecting pin 4 is not particularly limited and a usually known driving means such as air or hydraulic pressure or the like is adopted.

Figure 10:
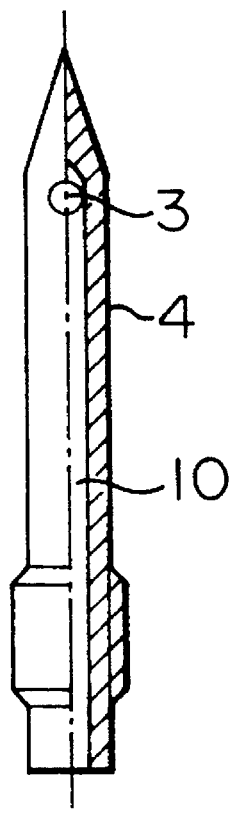
FIG. 10 shows the sectional view of an example of the fluid-ejecting pin used in the process of this invention.

The fluid-ejecting pin 4 is equipped with a fluid-ejecting hole 3 at its pointed end as shown in, for example, FIG. 10, and this fluid-ejecting hole 3 may be at the pin pointed end; however, usually, a plurality of fluid-ejecting holes are provided in the direction perpendicular to the pin axis, typically four holes are provided at a 90° space, in the vicinity of the pin pointed end, so that the fluid may be ejected in all directions.

Of course, needless to say, the place, number and the like of the fluid-ejecting holes 3 may be appropriately selected depending upon the size, shape and the like of the molded article.

Figure 2:
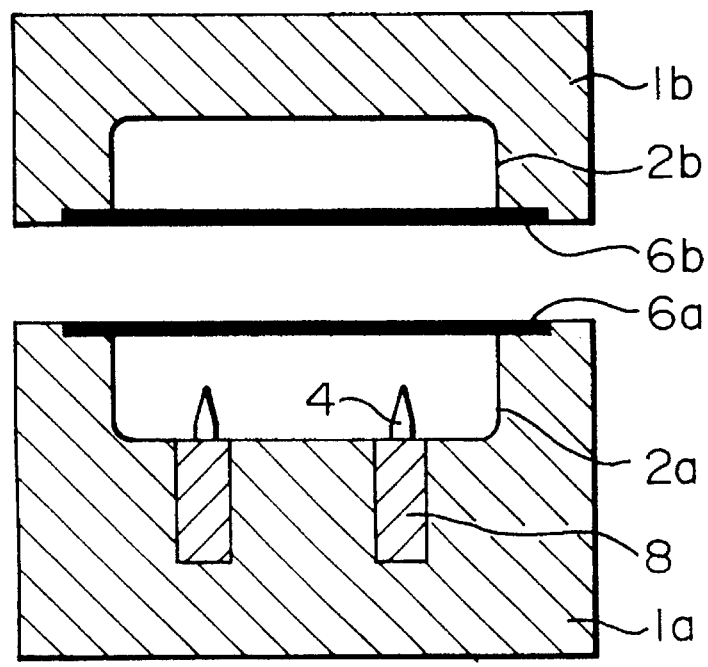
FIG. 2 is a sketch drawing of the process for producing a skin material-laminated hollow molded article of thermoplastic resin and shows the state in which the skin material has been fixed on the parting surface of the mold.

The end of the skin material is fixed on each of the parting surfaces 5a and 5b so that the cavity surfaces of both the fixed mold part 1a and the movable mold part 1b are covered, respectively, with the skin materials 6a and 6b. (FIG. 2)

The method of fixing the skin material on the parting surfaces 5a and 5b may be any method; however, simply, it may be a method using a pressure sensitive adhesive double coated tape.

The skin material used here is appropriately selected depending upon each use purpose such as surface decoration, cushioning medium, thermal insulator and the like for the objective hollow molded article; however, since the skin material is required to be expanded with elongation so that the molten thermoplastic resin 7 is wrapped in between the skin materials and the skin materials are intimately contacted with the mold cavity by the fluid-ejecting pressure, it is necessary that the tensile modulus be 50 to 1,000 kg/cm$^2$, preferably 80 to 300 kg/cm$^2$ at ordinary temperature (usually about 23° C.) and 5 to 100 kg/cm$^2$, preferably 10 to 30 kg/cm$^2$, at 80° C., whereby it is made possible to obtain a hollow molded article having a high blow ratio and a volume ratio in the hollow part of 50% or more.

Incidentally, the tensile modulus at this time may be in the above numerical value range in either of the lengthwise direction (MD) of the sheet or the direction perpendicular thereto (width direction) (TD), and it is not necessary that the tensile modulus be in the above numerical value range in both MD and TD.

As such a skin material, there is used, for example, a sheet or film of a thermoplastic resin or thermoplastic elastomer, a thermoplastic resin foamed sheet, a thermoplastic elastomer foamed sheet, a non-woven fabric, knit fabric, or a laminate consisting of a combination of them, and a concave-convex pattern such as emboss or the like; a print or the like may be applied to the surface of the skin material. Also, the upper and lower skin materials may be the same or different depending upon the purpose of use of molded article.

The thickness of the skin material may be varied depending upon the kind of the skin material; however, it is sufficient that the thickness is in such a range that at least the molten thermoplastic resin can be wrapped in between the skin materials and shaping by stretching is possible. Usually, it is about 0.5 to 4 mm.

Figure 3:
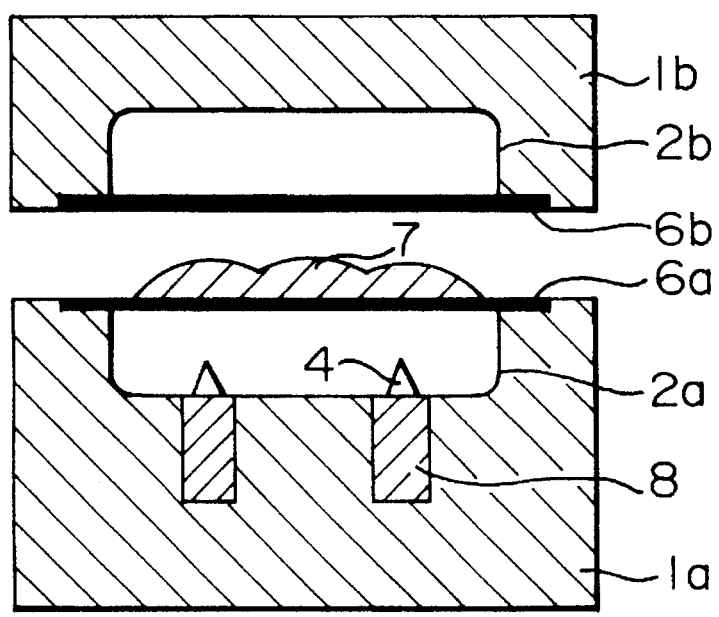
FIG. 3 is a sketch drawing of the process for producing a skin material-laminated hollow molded article of thermoplastic resin of this invention and shows the state in which the molten thermoplastic resin has been fed onto the skin material.

Subsequently, the molten thermoplastic resin is fed from the exterior of mold to between the upper and lower skin materials with which the cavity surfaces are covered, for example, by an extruder or the like (not shown in the figure). (FIG. 3)

In this feeding of the molten resin, it is preferable to uniformly feed the molten resin on the skin material by moving in the horizontal direction the opening of feeding molten resin from exterior of mold or horizontally moving the lower mold part so that the molten resin may be uniformly wrapped in between the skin materials.

The amount of the molten thermoplastic resin fed is usually in the range of from 5 to 50% by volume of the volume of the mold cavity formed by both the mold parts.

When the amount of the resin fed exceeds 50% by volume, the volume of the hollow part of the molded article obtained becomes small and it becomes impossible to expect a sufficient performance as a hollow molded article.

When the amount of the resin fed is less than 5% by volume, the amount of the resin is too small to uniformly and intimately contact the resin with the internal surface of the skin material even if a fluid is subsequently fed, and only a product having a non-uniform resin layer thickness is obtained in some cases.

The thermoplastic resin used here are required to be wrapped in the molten state in between the skin materials and subsequently moved so that the resin may be intimately contacted with the mold cavity surface by the fluid-ejecting pressure, and therefore, it is preferable that the resin be excellent in fluidity in the molten state.

Such thermoplastic resins include general thermoplastic resins such as polyethylene, polypropylene, polystyrene, acrylonitrile-styrene-butadiene copolymers, polyvinyl chloride, polyamides, polycarbonates, polyethylene terephthalate, polybutylene terephthalate, polyphenylene ethers, styrene-acrylonitrile copolymers and the like; mixtures of them; and polymer alloys using these thermoplastic resins; and the like.

Also, these thermoplastic resins may, if necessary, contain inorganic fillers such as talc, wollastonite, glass fiber and the like, and may, of course, contain various additives such as various antioxidants, ultraviolet absorbers and the like which are usually used and coloring agents.

Such a thermoplastic resin is conditioned so that the optimum fluidity may be obtained, by, for example, changing the melting temperature or changing the kind and the proportion of the compounding agents depending upon the molding conditions.

Figure 4:
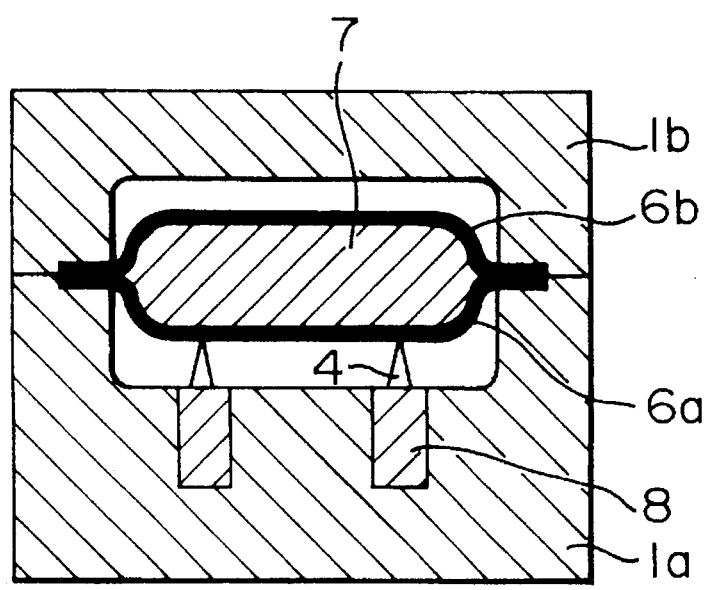
FIG. 4 is a sketch drawing of the process for producing a skin material-laminated hollow molded article of thermoplastic resin of this invention and shows the state in which the mold has been closed to wrap the molten thermoplastic resin in between the skin materials.

Immediately after the feeding of the molten thermoplastic resin 7, the movable mold part 1b is lowered to close the mold parts 1a and 1b. At this time, the molten thermoplastic resin fed between the skin materials 6a and 6b is wrapped in between the skin materials while the skin materials are stretched. (FIG. 4)

In this case, it is not objectionable for air to remain between the skin materials.

In this state, the fluid-ejecting pin 4 is thrust so that its pointed end penetrates one of the skin materials and comes into the molten thermoplastic resin (FIG. 5), and the fluid is fed from the fluid-ejecting hole 3.

In this case, it is necessary that the fluid-ejecting pin 4 be thrust into the molten thermoplastic resin without penetrating the other skin material, and it is preferable that the fluid-ejecting hole 3 comes substantially at the center of the two skin materials.

As the fluid, there are used various gases such as air, nitrogen, helium, carbon dioxide, oxygen and the like; and liquids such as water and the like. These are usually used at a pressure of about 2 to 10 kg/cm$^2$ which is necessary to expand the molten thermoplastic resin together with the skin materials in the cavity space in the airtight state.

Among such fluids, gases are preferably used in view of workability and the like, and among the gases, inert gases such as air, nitrogen, carbon dioxide and the like, especially compressed air, are preferably used. Also, if necessary, the fluid may be heated or cooled.

Figure 6:
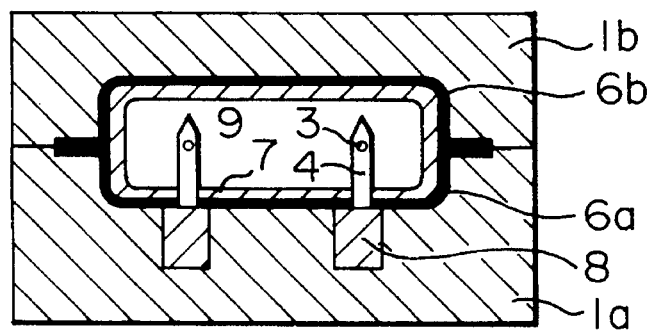
FIG. 6 is a sketch drawing of the process for producing a skin material-laminated hollow molded article of thermoplastic resin of this invention and shows the state in which a fluid has been ejected from the fluid-ejecting pints into the molten thermoplastic resin to form a hollow part.

By feeding the fluid into the molten thermoplastic resin, the molten resin is expanded by the fluid as if a balloon is inflated to form the hollow part 9 whereby the skin material is intimately contacted with the cavity surface, simultaneously with which a hollow molded article in which the thermoplastic resin and the skin material have been heat-bonded under pressure to each other is formed. (FIG. 6)

Figure 7:
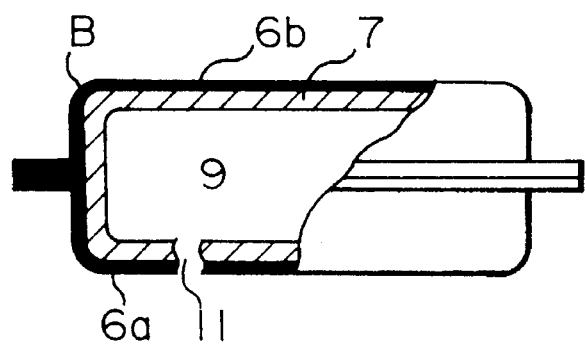
FIG. 7 shows the sectional view of the skin material-laminated hollow molded article of thermoplastic resin obtained by the process of this invention.

In this state, the cooling of the mold is started, and as soon as the solidification of the resin intimately contacted through the skin material with the cavity surface starts, the feeding of the fluid is stopped and the mold is further cooled to solidify the molten resin to such an extent that the fluidity loses, after which the mold is opened and a skin material-laminated hollow molded article of thermoplastic resin having a hollow part as shown in FIG. 7 is taken out.

In this case, the fluid-ejecting pins 4 may be put back in the mold before the opening of the mold, or the mold may be opened in the state that the pins are thrust and the molded article may then be taken out while being pulled out of the pins.

In any of the above cases, when the molten resin has been completely cooled and solidified, the sliding ability of the pin becomes bad, and therefore, it is preferable that when the molten resin has been solidified to such an extent that the fluidity loses the pins are put back in the mold or the mold is opened and the molded article is pulled out of the fluid-ejecting pins.

Figure 8:
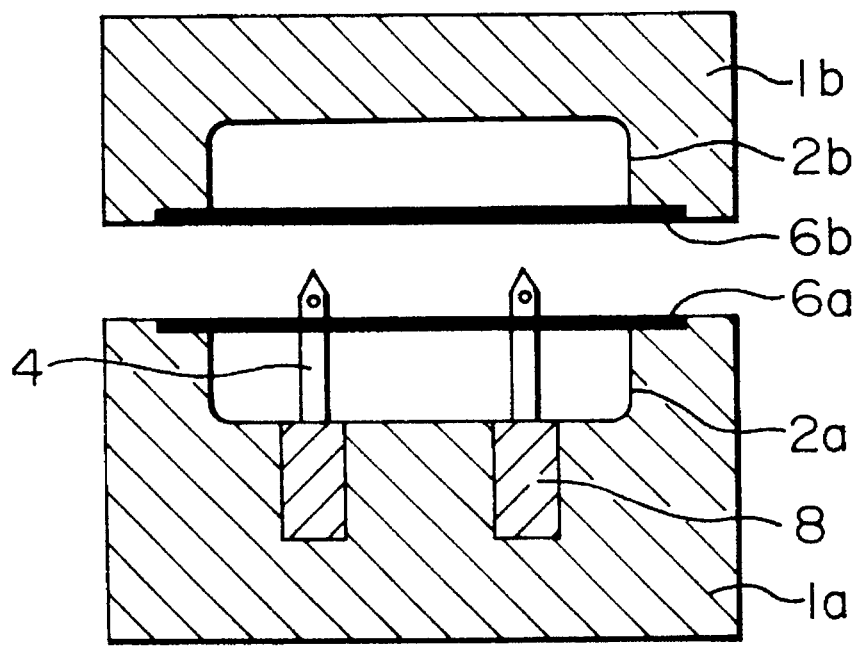
FIG. 8 is a sketch drawing of the process for producing a skin material-laminated hollow molded article of thermoplastic resin of this invention and shows the state in which the fluid-ejecting pins have been thrust into between the skin materials fixed on the mold parting surfaces.

In the above explanation, a process is described in which after the molten thermoplastic resin has previously been fed to between the skin material sheets fixed on the parting surfaces 5a and 5b of both the mold parts and the mold parts have been clamped, the fluid-ejecting pins are thrust to penetrate either one of the skin materials and come to between the skin materials, and subsequently the fluid is fed. However, a process may be adopted in which after the molten thermoplastic resin has been fed to between the fixed skin materials, the fluid-ejecting pins are thrust to penetrate either one of the skin materials and come to between the skin materials, the molds are thereafter clamped and subsequently the fluid is fed. Moreover, as shown in FIG. 8, the process can also be similarly carried out by previously thrusting the fluid-ejecting pins in between the skin materials fixed on the parting surfaces of the two mold parts and thereafter feeding the molten thermoplastic resin.

Figure 9:
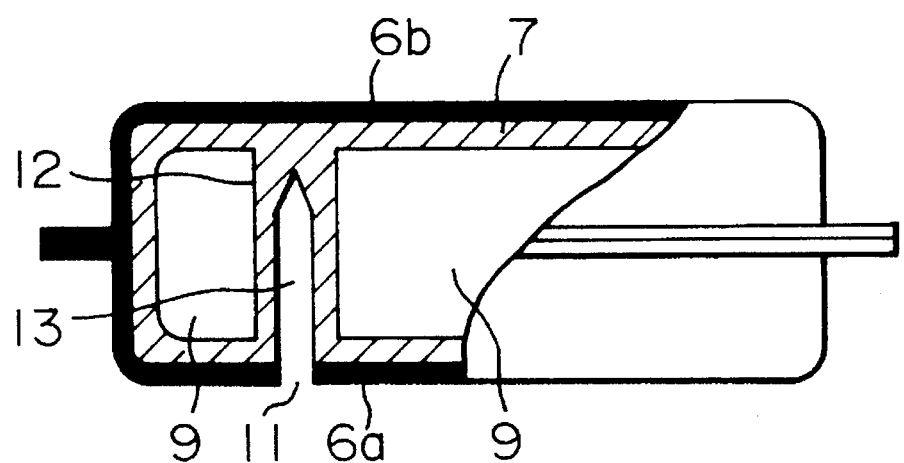
FIG. 9 shows the sectional view of the skin material-laminated hollow molded article of thermoplastic resin having a hollow rib in the hollow part of the hollow molded article obtained by the process of this invention.

Incidentally, in the process of this invention, a skin material-laminated hollow molded article in which a rib 12 whose interior is hollow 13 is formed as shown in FIG. 9 can be obtained, for example, by thrusting the fluid-ejecting pins so that their pointed ends approach the other skin material to such an extent as not to break through said other skin material, and simultaneously selecting such molding conditions that a part of the molten resin is easily cooled and solidified around the fluid-ejecting pins such as feeding the fluid at a low temperature from the fluid-ejecting pins to lower the temperature of the fluid-ejecting pins, prolonging the cooling period of time after the feeding of the fluid or the like, thereby solidifying the molten resin attached around the fluid-ejecting pins while connecting the solidified resin to the resin layers above and below the hollow molded article to form a rib 12 and pulling the fluid-ejecting pins after which the pin portions become hollow in the rib to form a rib hollow part 13.

The hollow molded article having a hollow rib thus obtained has a structure in which the interior is reinforced by the hollow rib, and therefore, is very excellent in strength.

Thus, the skin material-laminated hollow molded article of thermoplastic resin is produced, and in the molded article, the pin trace 11 remains after the fluid-ejecting pin has been pulled in some cases; however, the trace can be made very fine by making the thickness of the pin as fine as possible. Also, when some kinds of thermoplastic resins or skin materials are used, it is possible to make the trace apparently substantially unseen by their restoring force.

According to the production process of this invention, the wall thickness is uniform and can be easily controlled without being subject to restriction of the resin used, and moreover, a skin material-laminated hollow molded article of thermoplastic resin which can respond to a shape having a high blow ratio can be easily produced. Also, a hollow molded article having a hollow rib can be produced by selecting the molding conditions. The hollow molded article thus produced is light in weight and can be widely applied to various uses as a skin material-laminated molded article.

Working Example

This invention is explained in more detail below referring to Examples; however, it is needless to say that this invention is not limited thereby.

Incidentally, in the following Examples and Comparative Examples, the tensile modulus of a skin material was measured by the following method:

Tensile modulus: In accordance with JIS-K7113, a tensile test was conducted by a tensile tester.

Incidentally, as a test specimen, a dumbbell No. 1 specimen was used, and the tensile test was conducted in each of the sheet-winding direction (lengthwise direction) (MD) and the direction perpendicular thereto (width direction) (TD).

The test was effected under two conditions of ordinary temperature (23° C.) and 80° C. and the tensile speed was 50 mm/min.

The tensile modulus was indicated by the inclination of a straight line up to an elongation of 5% in the load-elongation diagram.

EXAMPLE 1

In accordance with the steps shown in FIGS. 1 to 6, a skin material-laminated hollow molded article of thermoplastic resin was produced by the following process.

The mold shown in FIG. 1 was put in the open state (the fluid-ejecting pins were put back in the mold leaving their pointed ends) and a skin material composed of a laminate of a soft vinyl chloride sheet as a surface layer to a polypropylene foamed sheet and having a thickness of 3.2 mm was fixed with a pressure sensitive adhesive double coated tape (not shown in the figure) on each of the mold parting surfaces 5a and 5b of the upper and lower mold parts 1a and 1b. (FIG. 2)

Onto the skin material applied onto the cavity surface of the fixed mold part 1a, a molten polypropylene resin at a resin temperature of 230° C. was fed in an amount of 40% by volume of the volume of the cavity space by means of a portable extruder. (FIG. 3)

Figure 5:
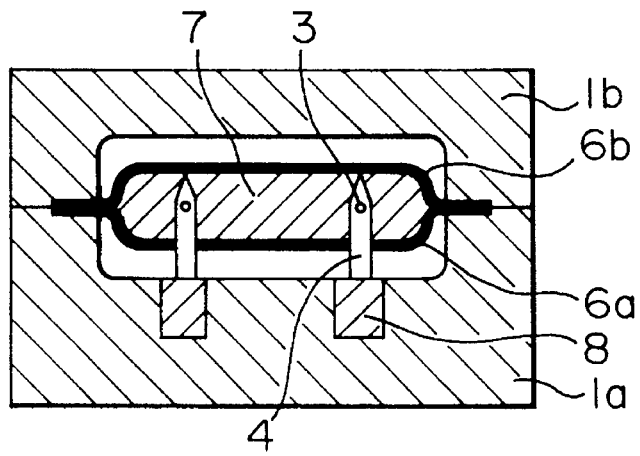
FIG. 5 is a sketch drawing of the process for producing a skin material-laminated hollow molded article of thermoplastic resin of this invention and shows the state in which fluid-ejecting pins have been thrust into the molten thermoplastic resin wrapped in between the skin materials.

Immediately after the feeding of the resin, the movable mold part 1b was lowered to clamp the two mold parts (FIG. 4), and subsequently, the fluid-ejecting pins 4 were thrust from the cavity surface 2a of the fixed mold part 1a to penetrate the skin material into the molten resin so that the fluid-ejecting holes 3 reach substantially the center between the two skin materials. (FIG. 5)

After 15-sec clamping, compressed air of 7.5 kg/cm$^2$ was fed into the molten resin from the fluid-ejecting holes 3 through the fluid-ejecting tube 10. (FIG. 6)

The mold was cooled for 120 seconds after the starting of feeding compressed air and thereafter the mold was opened to obtain a skin material-laminated hollow molded article of thermoplastic resin as shown in FIG. 7.

About 100 seconds after the starting of said cooling, the feeding of compressed air was stopped and the fluid-ejecting pints 4 were put back in the original place.

The molded article obtained was excellent in deep draw properties and also good in appearance.

Incidentally, the deep draw properties were evaluated by comparing the mold cavity corner dimension A with the hollow molded article corner dimension B of the product and indicating as "O" the case where A was equivalent to or larger than B and as "X" the case where A is smaller than B. The evaluation method in the following Examples and Comparative Examples is the same as above. The evaluation results are shown in Table 1 together with the results in other Examples.

EXAMPLE 2

In the same manner as in Example 1, except that a laminate sheet having a thickness of 3.2 mm in which a hard vinyl chloride sheet as a surface layer is laminated to a polypropylene foamed sheet was used, a skin material-laminated hollow molded article of thermoplastic resin was obtained.

The molded article obtained was excellent in deep draw properties and also good in appearance.

EXAMPLE 3

In the same manner as in Example 1, except that a polyester nonwoven fabric (weight: 245 g/m$^2$, manufactured by Hayashi Telempu Co., Ltd.) was used as a skin material, a skin material-laminated hollow molded article of thermoplastic resin was obtained.

The molded article obtained was excellent in deep draw properties and also good in appearance.

Comparative Examples 1 and 2

In the same manner as in Example 1, except that as a skin material, a nonwoven fabric of a polyester having a tensile modulus (MD/TD) at 23° C. of 17/26 and a tensile modulus at 80° C. of 12/19 (weight: 200 g/m$^2$, manufactured by Danic Corp.) and a fabric of a polyester having a tensile modulus (MD/TD) at 23° C. of 150/142 and a tensile modulus (MD/TD) at 80° C. of 130/126 (manufactured by KAWASHIMA TEXTILE MANUFACTURERS LTD.) were used, respectively, skin material-laminated hollow molded articles of thermoplastic resin were produced. However, when the nonwoven fabric of the polyester having a low tensile modulus at ordinary temperature (23° C.) was used, the hollow part was not sufficiently formed and it was impossible to produce a product having the desired shape.

Also, when the fabric of the polyester having a high tensile modulus at 80° C. was used as a skin material, the product was inferior in deep draw properties and unevenness appeared on the surface of the molded article.

EXAMPLE 4

The mold shown in FIG. 1 was put in the open state, and the same skin material as used in Example 1 was fixed on each of the mold parting surfaces 5a and 5b of the upper and lower mold parts 1a and 1b with a pressure sensitive adhesive double coated tape. Thereafter, as shown in FIG. 8, the rib-forming pins 4 were thrust so that their pointed ends penetrated the skin material sheet 6a and reached between the skin materials.

A molten polypropylene resin having a melting temperature of 225° C. was fed in an amount of 40% by volume of the volume of the cavity space when the mold was clamped, from the exterior to between the skin materials by means of a portable extruder.

Immediately after the feeding of the resin, the two mold parts were closed. Compressed air of 7.7 kg/cm$^2$ cooled to 10° C. was fed from the fluid-ejecting holes of the fluid-ejecting pins while the fluid-ejecting pins were adjusted so that the fluid-ejecting holes were substantially at the center between the two skin materials.

While the compressed air was fed for 15 seconds, the mold was quenched for 120 seconds from the start of feeding the compressed air.

During this period, the molten resin intimately contacted through the skin material with the cavity surface began to solidify by quenching the mold, and simultaneously therewith, the molten resin attached around the fluid-ejecting pins cooled by the low temperature compressed air began to solidify and was connected to the upper resin layer as the compressed air was ejected. In this state, the solidification further proceeded to form a rib.

After completion of the cooling of the mold, the mold was opened and a molded article was taken out while the fluid-ejecting pins were pulled out.

In the molded article obtained, a rib corresponding to the periphery of the rib-forming pins was formed as shown in FIG. 9, and in the rib, a hollow part was formed by pulling out the pins and the appearance was good.

Also, the product was excellent in strength.

UTILIZABILITY IN INDUSTRY

According to the production process of this invention, the wall thickness is uniform and can easily be controlled without being subject to restriction of the resin used, and moreover, a skin material-laminated hollow molded article which can respond to a shape having a high blow ratio can be easily produced. Also, by selecting the molding conditions, a hollow molded article having a hollow rib can be produced. Thus, the hollow molded article obtained is light in weight and is widely applied to various uses as a skin material-laminated product.

We claim:

1. A process for producing a skin material-laminated hollow molded article of thermoplastic resin, using a mold having, in at least one mold part selected from a fixed mold part and a movable mold part, at least one fluid-ejecting pin which can be slid in a direction in which the movable mold part moves and having a fluid-ejecting hole at a pointed end of the fluid injecting pin, which process consists of the following steps:

(1) fixing two sheets of skin material having a tensile modulus at ambient temperature of 50–1,000 kg/cm$^2$ and a tensile modulus at 80° C. of 5 to 100 kg/cm$^2$ on the parting surfaces of both the mold parts which are in the open state so that one of the sheets is fixed on the parting surface of the fixed mold part and the other sheet is fixed on the parting surface of the movable mold part, (2) feeding a molten thermoplastic resin between the skin material sheets in an amount of 5 to 50% by volume of the cavity volume, (3) thrusting the fluid-ejecting pin so that the pointed end thereof penetrates one of the skin material sheets and comes between the skin material sheets, (4) closing the mold to wrap the molten thermoplastic resin in between the skin material sheets, (5) ejecting a fluid from the fluid-ejecting hole to stretch the skin material sheets and intimately contact the skin material sheets with the cavity surface of the mold while allowing the fluid to form a hollow part within the molten resin, (6) cooling the mold and stopping the ejection of the fluid, and (7) opening the mold and taking out the hollow molded article.

2. A process for producing a skin material-laminated hollow molded article of thermoplastic resin, using a mold having, in at least one mold part selected from a fixed mold part and a movable mold part, at least one fluid-ejecting pin which can be slid in a direction in which the movable mold

TABLE 1

| | Skin material construction | | Tensile modulus (kg/cm$^2$) | | |
| --- | --- | --- | --- | --- | --- |
| | Surface layer/back | Thickness (mm) | MD/TD (23° C.) | MD/TD (80° C.) | Deep draw properties |
| Example 1 | Soft PVC/ foamed PP | 3.2 | 98/64 | 22/18 | 0 |
| Example 2 | Hard PVC/ foamed PP | 3.2 | 805/713 | 98/86 | 0 |
| Example 3 | Non-woven fabric (weight: 245 g/m$^2$ | 3.0 | 112/61 | 74/52 | 0 |
| Comp. Ex. 1 | Non-woven fabric (weight: 200 g/m$^2$) | 2.5 | 17/26 | 12/19 | X |
| Comp. Ex. 2 | Fabric | 2.5 | 150/142 | 130/126 | X | part moves and having a fluid-ejecting hole at a pointed end of the fluid injecting pin, which process consists of the following steps:

(1) fixing two sheets of skin material having a tensile modulus at ambient temperature of 50–1,000 kg/cm$^2$ and a tensile modulus at 80° C. of 5 to 100 kg/cm$^2$ on the parting surfaces of both the mold parts which are in the open state so that one of the sheets is fixed on the parting surface of the fixed mold part and the other sheet is fixed on the parting surface of the movable mold part, (2) feeding a molten thermoplastic resin between the skin material sheets in an amount of 5 to 50% by volume of the cavity volume, (3) closing the mold to wrap the molten thermoplastic resin in between the skin material sheets, (4) thrusting the fluid-ejecting pin into the molten thermoplastic resin so that the pointed end thereof penetrates one of the skin material sheets and comes between the skin material sheets, (5) ejecting a fluid from the fluid-ejecting hole to stretch the skin material sheets and intimately contact the skin material sheets with the cavity surface of the mold while allowing the fluid to form a hollow part within the molten resin, (6) cooling the mold and stopping the ejection of the fluid, and (7) opening the mold and taking out the hollow molded article.

3. A process for producing a skin material-laminated hollow molded article of thermoplastic resin, using a mold having, in at least one mold part selected from a fixed mold part and a movable mold part, at least one fluid-ejecting pin which can be slid in a direction in which the movable mold part moves and having a fluid-ejecting hole at a pointed end of the fluid injecting pin, which process consists of the following steps:

(1) fixing two sheets of skin material having a tensile modulus at ambient temperature of 50–1,000 kg/cm$^2$ and a tensile modulus at 80° C. of 5 to 100 kg/cm$^2$ on the parting surfaces of both the mold parts which are in the open state so that one of the sheets is fixed on the parting surface of the fixed mold part and the other sheet is fixed on the parting surface of the movable mold part, (2) thrusting the fluid-ejecting pin so that the pointed end thereof penetrates one of the skin material sheets and comes between skin material sheets, (3) feeding a molten thermoplastic resin between the skin material sheets in an amount of 5 to 50% by volume of the cavity volume, (4) closing the mold to wrap the molten thermoplastic resin in between the skin material sheets, (5) ejecting a fluid from the fluid-ejecting hole to stretch the skin material sheets and intimately contact the skin material sheets with the cavity surface of the mold while allowing the fluid to form a hollow part within the molten resin, (6) cooling the mold and stopping the ejection of the fluid, and (7) opening the mold and taking out the hollow molded article.

4. The process for producing a skin material-laminated hollow molded article of thermoplastic resin according to claim 1, 2 or 3, wherein after the cooling step, the fluid-ejecting pin is put back in the mold and subsequently both the mold parts are opened and the hollow molded article is taken out.

5. The process for producing a skin material-laminated hollow molded article of thermoplastic resin according to claim 1, 2 or 3, wherein the skin material is a thermoplastic resin or thermoplastic elastomer.

6. The process for producing a skin material-laminated hollow molded article of thermoplastic resin according to claim 1, 2 or 3, wherein the fluid is a gas.

7. The process for producing a skin material-laminated hollow molded article of thermoplastic resin according to claim 6, wherein the gas is compressed air.

8. The process for producing a skin material-laminated hollow molded article of thermoplastic resin according to claim 1, 2 or 3, wherein the sheet of skin material is a film of a thermoplastic resin or thermoplastic elastomer.

* * * * *